US012607264B2

(12) United States Patent
Green

(10) Patent No.: US 12,607,264 B2
(45) Date of Patent: Apr. 21, 2026

(54) SEALING MEANS, IMPROVED SLIP JOINT APPARATUS AND/OR METHODS OF USE THEREOF

(71) Applicant: TECONNEX LTD., Keighley (GB)

(72) Inventor: Richard Green, Keighley (GB)

(73) Assignee: TECONNEX LTD., Keighley (GB)

( * ) Notice: Subject to any disclaimer, the term of this patent is extended or adjusted under 35 U.S.C. 154(b) by 0 days.

(21) Appl. No.: 18/507,941

(22) Filed: Nov. 13, 2023

(65) Prior Publication Data

US 2024/0159315 A1     May 16, 2024

(30) Foreign Application Priority Data

Nov. 14, 2022     (GB) ...................................... 2216922

(51) Int. Cl.
*F16J 15/32*          (2016.01)
*F16L 27/12*          (2006.01)

(52) U.S. Cl.
CPC ............... *F16J 15/32* (2013.01); *F16L 27/12* (2013.01)

(58) Field of Classification Search
CPC ....... F16L 27/12; F16L 17/025; F16L 17/035; F16J 15/32
See application file for complete search history.

(56) References Cited

U.S. PATENT DOCUMENTS

| | | | | |
|---|---|---|---|---|
| 2,968,501 | A | * | 1/1961 | Tisch ........................ F16J 15/32 |
| 3,366,392 | A | * | 1/1968 | Kennel .................... F16J 15/32 |
| 3,724,878 | A | | 4/1973 | Ford |
| 3,895,815 | A | * | 7/1975 | Panigati ............... F16J 15/3204 |
| | | | | 277/910 |
| 4,546,987 | A | * | 10/1985 | Bucher ................. F16L 17/025 |
| 5,024,454 | A | * | 6/1991 | McGilp .................... F16L 27/12 |
| 2011/0074150 | A1 | * | 3/2011 | Drost .................. F16L 27/1012 |
| 2019/0010855 | A1 | | 1/2019 | Green |
| 2020/0393046 | A1 | * | 12/2020 | Szparagowski .......... F16J 15/32 |

* cited by examiner

*Primary Examiner* — Zachary T Dragicevich

(74) *Attorney, Agent, or Firm* — McKee, Voorhees & Sease, PLC

(57)          ABSTRACT

Manners of sealing for use with slip joint apparatuses are provided that includes a first surface which is arranged to contact a surface of an item in use, and one or more side wall surfaces extending away from the first surface. The first surface and/or said one or more side wall surfaces are arranged so as to allow a degree of pivotable and/or angular movement of at least the first surface of the sealing with respect to the item surface with which it contacts in use.

2 Claims, 3 Drawing Sheets

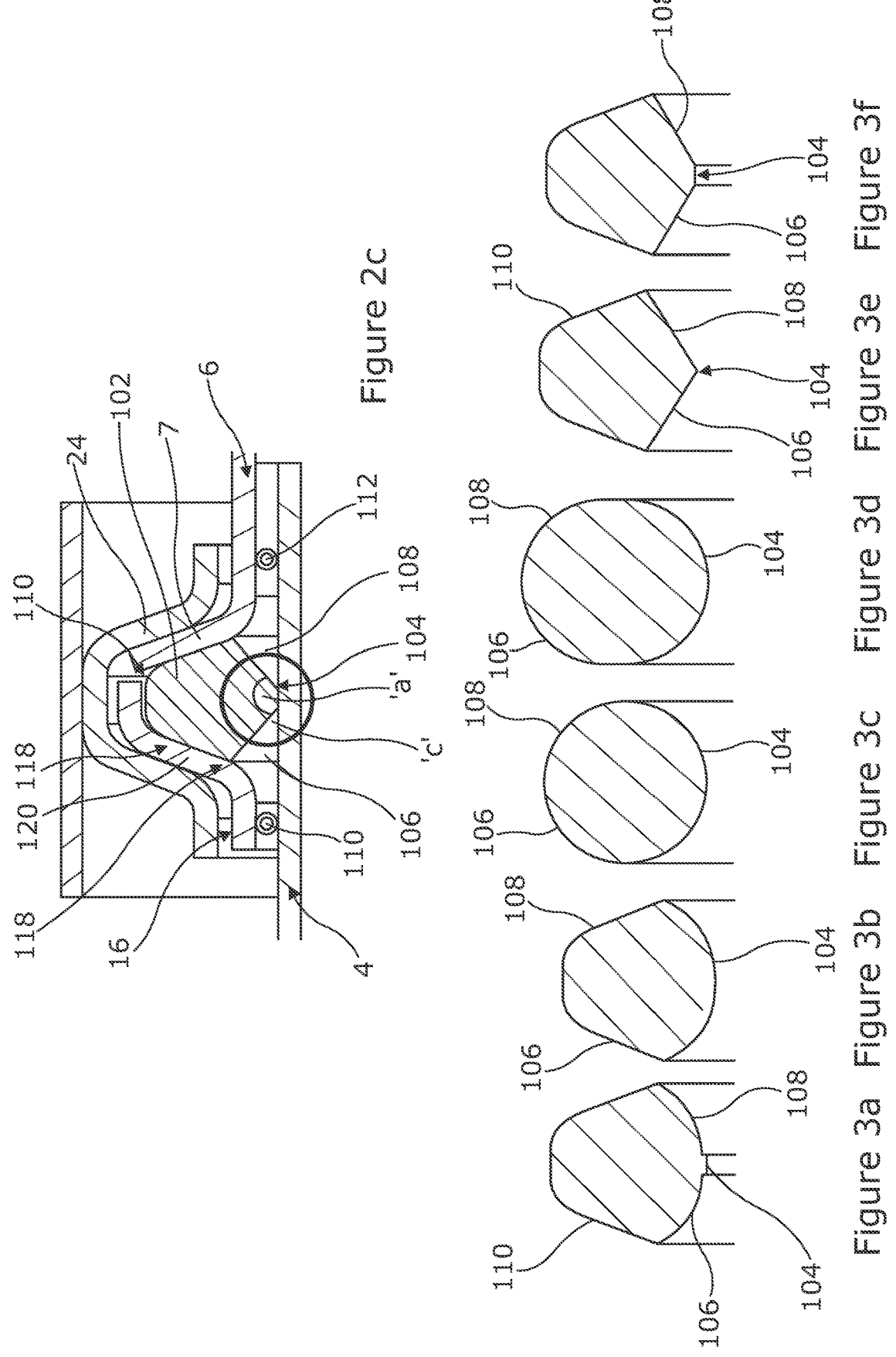

SEALING MEANS, IMPROVED SLIP JOINT APPARATUS AND/OR METHODS OF USE THEREOF

APPARATUS AND/OR METHODS OF USE THEREOF

This invention relates to improved slip joint apparatus, sealing means suitable for use with slip joint apparatus and/or to methods of use thereof.

Although the following description refers almost exclusively to sealing means and/or slip joint apparatus for use in the clamping of exhaust pipes of vehicles, it will be appreciated that the sealing means and/or slip joint apparatus can be used in any suitable application, such as for example, air conditioning systems, gas transportation systems and/or the like.

A slip joint is generally used to join two components together and which allows some movement between the components in the axial direction. The slip joint apparatus can allow for continuous relative movement of the two components or can allow adjustment of the two components from one temporary fixed position to another temporary fixed position. An example of a conventional slip joint is disclosed in EP3394494 and is described in further detail with reference of FIGS. 1*a* and 1*b* enclosed herewith. The slip joint assembly 2 in this example is used for the connection of two cylindrical pipes together; inlet pipe 4 and outlet pipe 6, such as for example in a vehicle exhaust system. With the pipes 4, 6 joined together, exhaust fluid is able to flow along the joined pipes. Outlet pipe 6 has a flared end 7. A slip flare 8 is provided for location over the free end of the inlet pipe 4. The slip flare 8 has a first skirt section 10 adjacent end 12 which is outwardly flared or has a larger diameter compared to a second skirt section 14 adjacent second end 16. When assembled, the slip flare 8 is located over the free end 18 of inlet pipe 4, together with a sealing gasket 20. The free end 18 of inlet pipe 4 is inserted into the flared open end of outlet pipe 6, such that the sealing gasket 20 is in abutting relationship with the slip flare 8 and the flared end 7 of the outlet pipe 6. A retaining clamp 22, which in this example is a V-clamp, is provided over the flared end 7 of outlet pipe 6, the sealing gasket 20 and slip flare 8 to retain the slip joint together in use. The retaining clamp 22 comprises a band 24 having two strap members 26, 28 located at opposing ends 30, 32 of the band 24. Tensioning means in the form of a trunnion 34 is provided between the two strap members 26, 28 to allow clamping or unclamping of the retaining clamp in use. With the retaining clamp 22 in a clamped position, the two opposing ends 30, 32 are moved relatively closer together. With the retaining clamp 22 in an unclamped position, the two opposing ends 30, 32 are moved relatively further apart.

The conventional sealing gasket 20 used in the slip joint apparatus is typically annular in form and the cross sectional shape comprises a flat base surface 36 for making continuous surface contact with the outer surface of the inlet pipe 4 when assembled. The side walls adjoining the flat base surface are either upwardly and inwardly protruding or are at an approximate 90 degree angle with respect to the base surface. The remaining outer perimeter shape 38 of the sealing gasket 20 is such so as to conform or substantially conform to the inner peripheral shape of the slip flare 8 and flared end 7 of the outlet pipe 6 when assembled.

Use of the slip joint in the exhaust system application allows a degree of tolerance between the two pipes 4, 6, meaning that the length of the inlet and outlet pipes is not critical. This is of particular benefit when the pipework is being manufactured as the forming, cutting and/or assembly of individual pipes can result in deviations in the lengths of the pipes. If a standard joint is used rather than a slip joint; a standard joint being where pipe ends butt up to a flare, the deviation in pipe length would result in the pipe ends being either too far part or too close together. This would place stress on the joint and could result in failure of the joint in use.

However, problems associated with the conventional slip joint apparatus are that the assembly is not generally intended to move in the axial direction once the pipes are in service and the slip joint is largely there to provide axial tolerance absorption during assembly of the slip joint apparatus. Use of the conventional sealing gasket and clamp of the slip joint apparatus requires a relatively high torque to provide sufficient clamping pressure and sufficient contact pressure between the sealing means and the inlet pipe on which it is located in use. Furthermore, conventional slip joint apparatus cannot withstand dynamic angular movement and is therefore limited in the applications it can be used with. Conventionally, if a system is required that can absorb dynamic angular movement, a bellows coupling is used. However, such couplings are significantly more expensive to provide and also have larger packaging requirements compared to slip joint apparatus.

It is therefore an aim of the present invention to provide improved slip joint apparatus that overcomes the abovementioned problems.

It is a further aim of the present invention to provide sealing means or a sealing gasket that is suitable for use in slip joint apparatus that overcomes the abovementioned problems. However, it will be appreciated that the sealing means or gasket could be used in applications other than slip joint apparatus if required.

It is a further aim of the present invention to provide a method of using improved slip joint apparatus and/or sealing means for use in slip joint apparatus.

According to a first aspect of the present invention there is provided sealing means; said sealing means including a first surface which is arranged to contact a surface of an item in use; and one or more side wall surfaces extending away from the first surface; and wherein said first surface and/or said one or more side wall surfaces of the sealing means are arranged so as to allow a degree of pivotable and/or angular movement of at least the first surface of the sealing means with respect to the item surface with which it contacts with in use.

Preferably the first surface of the sealing means makes sealing contact with the surface of the item, and preferably with an outer surface of the item in use. Yet further preferably, this sealing contact is made when a clamping force is applied to the sealing means in use.

In one embodiment the first surface of the sealing means can also be referred to as a base surface of the sealing means in one example. Thus, the sealing means of the present invention, which can be used with slip joint apparatus in one example in use, are arranged to allow at least a degree of angular and/or pivotable movement in use. This pivotable or angular movement is typically about the first surface (i.e. the first surface is able to act as a pivot point or surface with respect to the item on which it is located on and/or relative to other items which are being joined with the item in use). This is in contrast to prior art sealing means which do not allow angular and/or pivotable movement in use. In addition, a much lower torque is required to clamp the sealing means onto a surface or an outer surface of the item in use in order to provide the required level of surface contact of the sealing means with the item. In one example of the present invention, approximately 70% less torque is required. When the sealing means is used as part of slip joint apparatus, the resulting slip joint apparatus is able to both absorb initial tolerance stacks and move during service when assembled due to thermal expansion and/or vibration for example. The advantage of this is a further reduction of stress on the components or items being joined by the slip joint apparatus in use. The slip joint apparatus of the present invention can absorb initial angular misalignment but can also withstand dynamic angular movement during service. The relatively smaller contact area of the sealing means of the present invention on the item or conduit on which the sealing means is used allows for increased contact pressure for any given load. In turn, this allows for a lower sealing force and means the joint can move more easily while maintaining a seal or sealing contact. An example of the improvement of the present invention compared to a conventional slip joint arrangement is the conventional slip joint requires 1500 N force in order to allow sliding movement within the joint in an axial direction compared to 300 N for the slip joint apparatus of the present invention. Thus, the sealing means of the present invention, in one embodiment, allows angular and/or axial or linear movement between two or more items being joined together in use.

In one embodiment the first surface of the sealing means is arranged to have minimal surface contact with the item with which it is provided on/makes contact with in use. Preferably this allows for the sealing means to be compressed radially inwardly when clamping means are tightened around the sealing means in use.

In one embodiment the sealing means and/or first surface of the sealing means is shaped, designed and/or dimensioned so as to provide a point contact with the item which it is provided on in use and/or is in the form of an apex.

In one embodiment the sealing means and/or first surface of the sealing means is shaped, designed and/or dimensioned such that the first surface has a minimum contact of 0.1 mm+/0.05 mm with the item on which it is to be provided in use (i.e. with or without clamping pressure being applied to the same). Thus, in one example the first surface has a minimum length of 0.1 mm+/−0.05 mm. In one example, the first surface has a contact length of approximately 0.75 mm+/−0.05 mm with the item in use.

In one embodiment the sealing means and/or first surface of the sealing means is shaped such that the first surface has a maximum contact length of about 3 mm+/−0.5 mm with the item on which it is to be provided in use. Thus, in one example, the first surface has a maximum length of about 3 mm+/−0.5 mm.

In one example, the first surface is a linear, planar and/or flat surface, or a substantially linear, substantially planar and/or substantially flat surface.

In one example, the first surface provides a point or apex to the sealing means.

In one example, the first surface is a curved, convexed, substantially curved or substantially convexed surface.

In one example, the first surface provides a hemispherical or substantially hemispherical surface to the sealing means.

Preferably the sealing means includes two or more side walls or two opposing side walls.

Preferably at least one of the side walls or opposing side walls adjoining the first surface protrudes upwardly (or away) and outwardly from the first surface. Further preferably at least two side walls or both opposing side walls adjoining the first surface protrude upwardly (o away) and outwardly from the first surface.

In one embodiment an interior angle between the first surface and at least one of the adjoining side walls of the sealing means is greater than 90 degrees. Preferably this angle is taken from a horizontal or planar surface or point of the first surface and the interior adjoining side wall surface. This is in contrast to prior art sealing means wherein the angle between the first surface and an adjoining interior side wall is 90 degrees or less.

In one example an angle between the first surface and a first adjoining side wall is the same, substantially the same, different or substantially different to the angle between the first surface and a second or opposite adjoining side wall. However, in one example, it is preferable if the angle between the first surface and the first adjoining side wall is the same as the angle between the first surface and the opposing second adjoining side wall so that the sealing means can be fitted onto an item in use in any orientation.

In one embodiment the total angle between the opposing side walls adjoining the first surface is between approximately 90-180 degrees.

In one embodiment the total angle between the opposing side walls adjoining the first surface of the sealing means is less than 180 degrees, preferably less than or equal to 140 degrees, preferably less than or equal to 135 degrees, further preferably less than or equal to 130 degrees, yet further preferably less than or equal to 125 degrees, yet further preferably less than or equal to 120 degrees, yet further preferably less than or equal to 115 degrees, yet further preferably less than or equal to 110 degrees, yet further preferably less than or equal to 105 degrees, yet further preferably less than or equal to 100 degrees, yet further preferably less than or equal to 95 degrees, yet further preferably less than or equal to 90 degrees. This is in contrast to prior art sealing means wherein the total angle between the opposing side walls adjoining the first surface is 180 degree or more.

In one embodiment the angle between a side wall adjoining the first surface of the sealing means and a surface of the item on which the sealing means is provided in use is less than 90 degrees, preferably less than or equal to 85 degrees, further preferably less than or equal to 80 degrees, yet further preferably less than or equal to 75 degrees, yet further preferably less than or equal to 70 degrees, yet further preferably less than or equal to 65 degrees, yet further preferably less than or equal to 60 degrees, yet further preferably less than or equal to 55 degrees, yet further preferably less than or equal to 50 degrees, yet further preferably less than or equal to 45 degrees. This is in contrast to prior art sealing means wherein the angle between a side wall adjoining the first surface and a surface of the items on which the sealing means is provided in use is 90 degrees or greater.

In one embodiment the angle between a side wall adjoining the first surface and a surface of the item on which the sealing means is provided in use is between 20-60+/−5 degrees, and preferably 45 degrees+/−5 degrees.

In one embodiment the sealing means and/or cross sectional shape of the sealing means is symmetrical and/or substantially symmetrical.

In one embodiment the sealing means and/or cross sectional shape is asymmetrical and/or substantially asymmetrical in form.

In one embodiment the first surface of the sealing means is the surface that faces and/or contacts the item with which the sealing means is to be located on in use. Preferably the item is a conduit or pipe.

In one embodiment the first surface is planar, substantially planar, flat or substantially flat and the one or more adjoining side walls extend outwardly and away from the first surface (i.e. the opposing adjoining side walls form a widening taper away from the first surface).

In one embodiment the first surface is curved, substantially curved, convexed or substantially convexed and the angle between the curved first surface and the adjoining side wall can be less than or equal to 90 degrees, or the angle between a side wall adjoining the first surface and a surface of the items on which the sealing means is provided in use is 90 degrees or greater. In this embodiment, the one or more side walls typically protrude upwardly (or away) and inwardly from the first surface (i.e. the opposing adjoining side walls form a narrowing taper away from the first surface).

Preferably the lengths and/or angles of the sealing means provided herein are when the sealing means is in a relatively uncompressed or unclamped position. Once clamping tension or torque is applied to the sealing means, such as when used in a slip joint assembly in one example, this is likely to change the shape and/or angles of the sealing means (i.e. to a more flattened state).

Preferably the sealing means is annular or substantially annular in form.

In one embodiment the sealing means is a continuous or substantially continuous member.

In one embodiment the sealing means may be a non-continuous member.

In one embodiment the sealing means is in the form of a gasket or sealing gasket.

Preferably the sealing means is formed from or includes graphite. This is advantageous as graphite can act as a lubricant for the dynamic movement provided by the sealing means. However, the sealing means could be formed from any or any combination of material(s), such as graphite, rubber, stainless steel, metal, Mica, Vermiculite and/or the like. The type of material(s) chosen for the sealing means may, in one example, depend on the temperature environment the sealing means will operate in. For example, sealing means used in a relatively low temperature environment may include rubber, whereas sealing means used in a relatively high temperature environment may include graphite.

In one embodiment the sealing means is relatively softer and more compressible compared to steel so that it can function dynamically without losing its sealing capabilities.

In one embodiment the sealing means includes a graphite and stainless steel wire mesh construction.

In one embodiment the sealing means is of such shape, design and/or dimensions that when used with slip joint apparatus in use, it provides a clearance or gap sufficient to allow axial and/or angular movement or movement in an axial and/or angular direction between a first conduit on which the sealing means is located in use and a second conduit which has a slip flare or flared end; and/or between the sealing means and the first conduit on which it is located in use.

In one embodiment the sealing means is of such shape, design and/or dimensions to provide an increased clearance or gap between a slip flare or a flared end of a conduit with which the sealing means is used with and a further item or conduit with which the sealing means is used with. This increased clearance or gap allows for improved movement of the components of the apparatus in an axial direction and/or in an angular direction in use.

Preferably the clearance or gap is radial clearance or a radial gap.

Preferably the clearance or gap is sufficient so as to allow a degree of movement between the slip flare, the flared end of the conduit and/or the further item or conduit in an axial and/or angular direction in use.

Preferably the clearance or gap is approximately 1-3 mm+/−0.5 mm in height between the two items being clamped together and/or the height between the slip flare and the conduit or first item on which the slip flare is used. In one example, the clearance or gap is approximately 1.5 mm+/−0.5 mm in height.

Preferably the height of the clearance or gap between the slip flare and the conduit or item, or between the two conduits or items being joined together in use, is equal to or substantially equal to the height between the Preferably the first item is a conduit, pipe, sleeve and/or the like.

Preferably the first surface and the opposite end of the side wall adjoining the base surface.

Preferably the first conduit is located at least partially inside a second conduit with a slip flare or flared end in use.

In one embodiment the sealing means forms part of slip joint apparatus.

Preferably the slip joint apparatus includes a first item or conduit and at least a second item or conduit which is to be joined to the first item or conduit in use.

Preferably the first item or conduit has a non-flared end or open end. Preferably the sealing means is arranged to engage with the outer surface of the first item or conduit having the non-flared end or open end in use.

Preferably the second item or conduit has a flared open end.

Preferably the non-flared end or open end of the first item or conduit is located in the flared open end of second item or conduit in use. Thus, preferably the first and second conduits are brought into overlapping engagement in use.

Preferably the apex, point or curved end of the sealing means is located on the outer surface of the first item or conduit in use.

Preferably the slip joint apparatus includes an intermediate joining element or a slip flare.

It will be appreciated that the sealing means and/or slip joint apparatus could be arranged so as to provide axial movement without or with a reduced angular movement (i.e. by not providing or by reducing the size of the clearance or gap between the non-flared end conduit and the slip flare or between the non-flared end conduit and the flared end conduit).

Preferably the shape of the sealing means that is in contact with the slip flare and the flared end of the conduit in use is complementary or substantially complementary in shape to the same. This means that when a compressive force is applied to the sealing means in use, the force is directed towards the first surface and hence providing an optimal sealing contact force between the first surface and the item on which the sealing means is located.

Preferably the slip joint apparatus includes clamping means.

Preferably the clamping means is any means or device that allows a clamping force to be applied to two or more items being joined by the clamping means in use.

Preferably the clamping means is movable between a clamped position, wherein a clamping force is applied to the two or more items being joined together in use, and an unclamped position, wherein a clamping force is removed or reduced to allow separation of the items in use.

In one embodiment the clamping means includes a V-clamp or a U-clamp. However, the clamp means could include a G-coupling, G-clamp, hinged V-clamp and/or the like.

Preferably the sealing means of the present invention can replace a conventional sealing means or gasket in a conventional slip joint assembly or apparatus.

According to a further aspect of the present invention there is provided slip joint apparatus, said slip joint apparatus including a first item having a first end and a second item having a second end, the second end of the second item being arranged so that it can be brought into overlapping engagement with the first end of the first item in use, and sealing means, and wherein the sealing means includes a first surface which is arranged to contact an outer surface of the first item in use, and one or more side wall surfaces extending away from said first surface, and wherein said first surface and/or said one or more side wall surfaces are arranged so as to allow a degree of pivotable and/or angular movement of at least the first surface of the sealing means with respect to the outer surface of the first item on which is to be provided in use.

Preferably the slip joint apparatus includes an intermediate joining element for helping to join the first and second components together in use.

Preferably the intermediate joining element is a slip flare.

Preferably the slip joint apparatus is slip spherical joint apparatus.

Preferably the apparatus and/or sealing means also allows axial movement between the sealing means and the first item and/or between the first and second items in use.

According to a first aspect of the present invention there is provided sealing means suitable for use with slip joint apparatus, said sealing means including a first surface which is arranged to contact an outer surface of an item in use, and one or more side wall surfaces extending away from said first surface, and wherein said first surface and/or said one or more side wall surfaces are arranged so as to allow a degree of pivotable and/or angular movement of at least the first surface of the sealing means with respect to the outer surface of the item on which is to be provided in use and/or a degree of axial movement of the sealing means with respect of the item on which it is to be provided in use, or between the item and a further item of the slip joint apparatus in use.

According to a further independent aspects of the present invention there is provided a method of using sealing means and/or a method of using slip joint apparatus.

According to an aspect of the present invention there is provided a method of using sealing means; said method including the steps of moving a first surface of the sealing means into contact with a surface of an item such that one or more side wall surfaces of the sealing means extend away from the first surface of the item; and wherein said first surface and/or said one or more side wall surfaces are arranged so as to allow a degree of pivotable and/or angular movement of at least the first surface of the sealing means with respect to the item surface with which it contacts.

Thus, it can be seen that the present invention provides a sealing means and/or slip joint apparatus that allows for axial and/or angular movement in use. In addition, improved radial clearance can be provided between the items being clamped or joined together in use that allows axial and/or angular movement in use.

Embodiments of the present invention will now be described with reference to the following figures, wherein:

FIG. 2c is the same cross sectional view of the slip joint apparatus in FIGS. 2a and 2b with angles shown.

FIGS. 3a-3f show non-exhaustive list of examples of different shaped sealing gaskets that could be used according to different embodiments of the present invention.

Figure 1A:
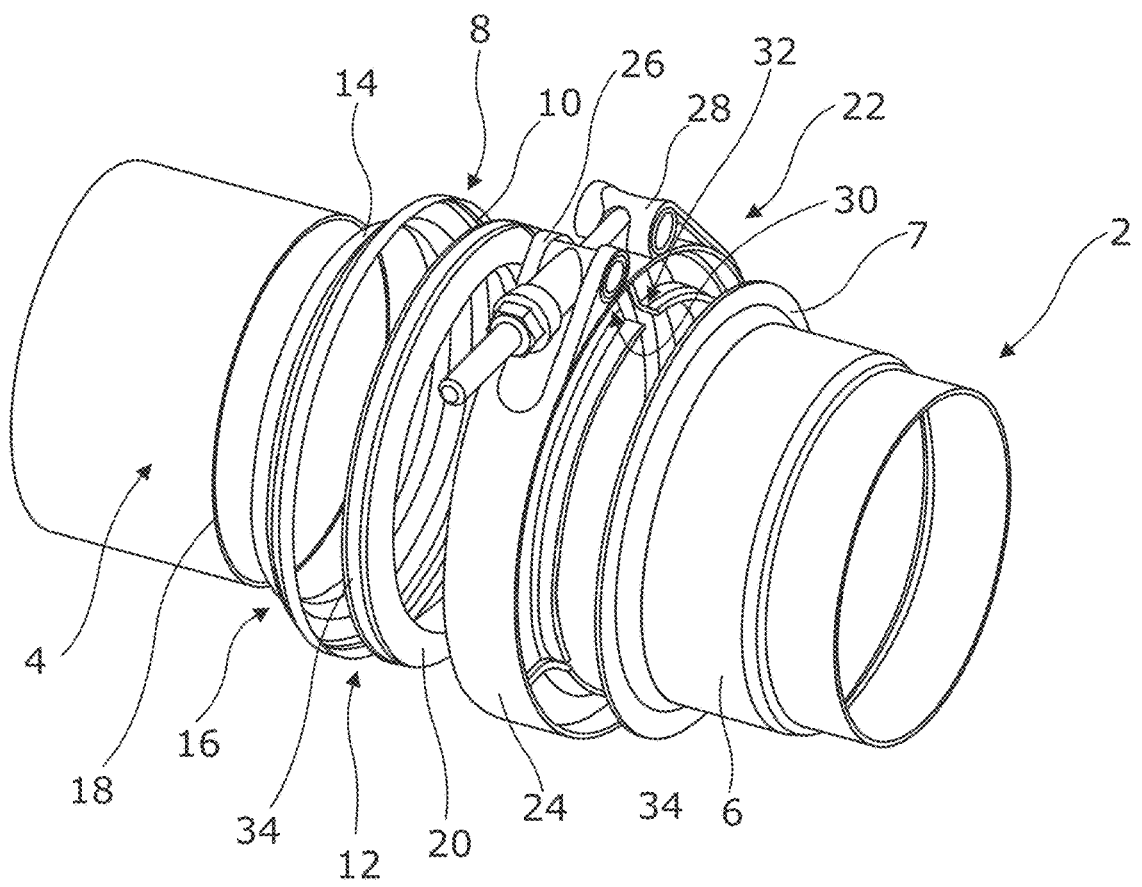
FIG. 1a (PRIOR ART) is an exploded perspective view of an example of a conventional slip joint assembly.
Figure 1B:
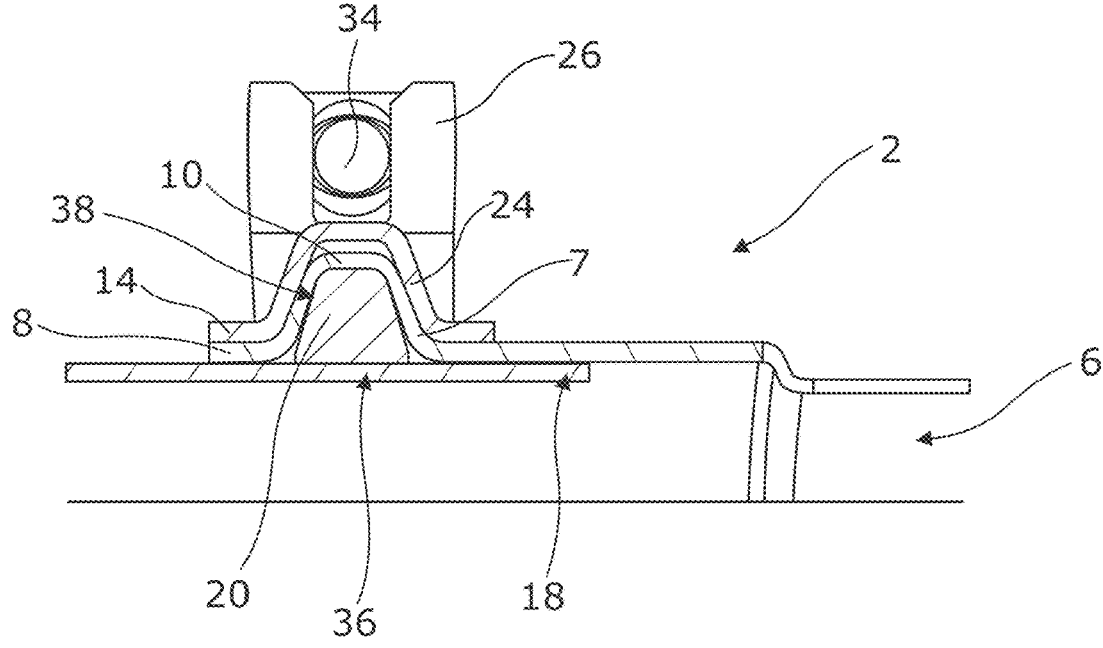
FIG. 1b (PRIOR ART) is a cross sectional view of the conventional slip joint assembly in an assembled condition.
Figure 2A:
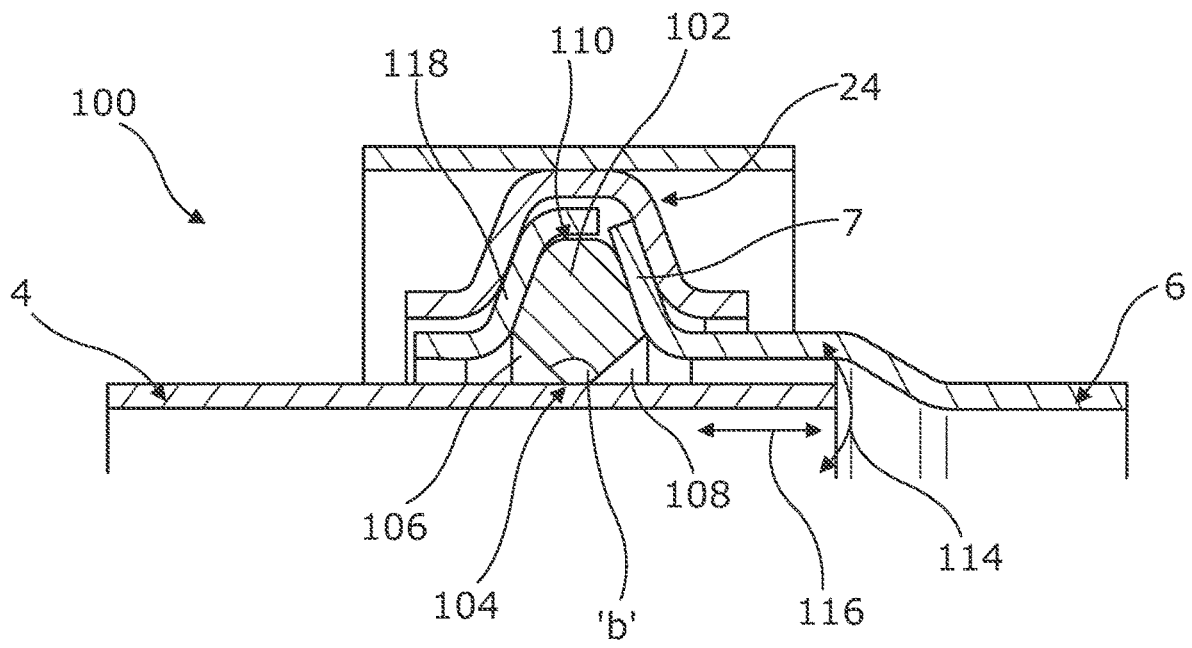
FIG. 2a is a cross sectional view of slip joint apparatus according to an embodiment of the present invention.
Figure 2B:
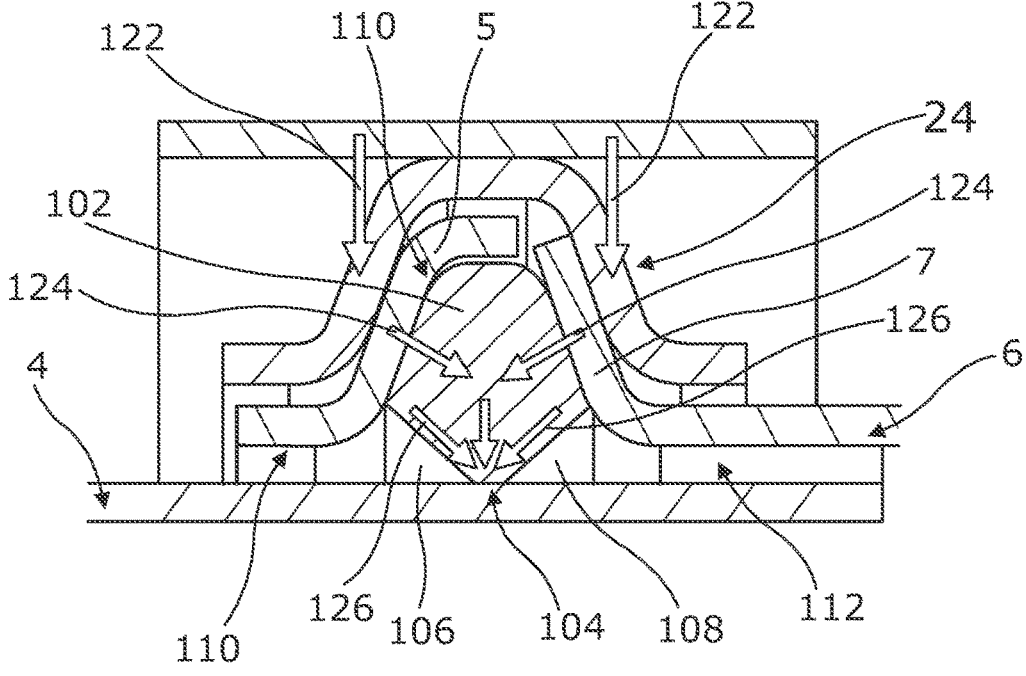
FIG. 2b is the same cross sectional view of the slip joint apparatus in FIG. 2a with the direction of forces that might be applied to the slip joint apparatus in use illustrated.

Referring to FIGS. 2a-2c, there is illustrated a cross sectional view of slip joint apparatus 100 according to an embodiment of the present invention used for the joining together of two cylindrical conduits 4, 6 as previously described. The same reference numerals have been used to describe the same features as for FIGS. 1a and 1b. The apparatus of the present invention is similar to that shown in FIGS. 1a and 1b but with the exception of a different sized and/or shaped gasket used in the present invention.

Sealing means in the form of a gasket 102 is provided in accordance with an embodiment of the present invention. The gasket 102 has a first or base surface 104 that faces the inlet pipe 4 and engages with an outer surface of the same when the slip joint apparatus 100 is assembled. First and second opposing side walls 106, 108 of the gasket are joined to opposite ends of the base surface 104 and protrude upwardly (away) and outwardly from the base surface. A further side wall 110 joins the first and second opposing side walls together. At least part of the further side wall 110 is opposite base surface 104 in this example. However, it will be noted that the side walls 106, 108 could also be arranged to be opposite the base surface in one example.

The base surface 104 has been designed such that a relatively smaller contact surface area is provided with inlet pipe 4 compared to prior art sealing gasket arrangements. In addition, the opposing side walls 106, 108 joining with the base surface 104 are angled upwardly and outwardly at the same or substantially the same angle. More particularly, in this example, the angle 'a' between opposing side walls 106 is approximately 90 degrees. The angle 'b' between the base surface and each adjoining side walls 106, 108 is approximately 135 degrees. The angle 'c' between the adjoining side wall 106 and the outer surface of the inlet pipe 4 is approximately 45 degrees. This arrangement allows the sealing gasket 102 to be pivotably movable or undergo angular movement about the base surface 104 in use. The angles 'a', 'b', 'c' could vary but still allows the same angular and/or axial movement as required.

In addition, the shape and dimensions of the sealing gasket 102 are arranged such that a clearance or gap 110, 112 is provided between the inwardly facing surface of the slip flare adjacent end 14 and the outwardly facing surface of the inlet pipe 4, and between the inwardly facing surface of the outlet pipe 6 and the outwardly facing surface of the inlet pipe 4 respectively. The combination of the clearance or gaps 110, 112 and the reduced contact surface of base surface 104 with inlet pipe 4 allows the slip joint apparatus 100 to undergo pivotable movement, as shown by arrow 114, as well as axial movement, as shown by arrow 116. This allows the slip joint apparatus 100 of the present invention to absorb initial tolerance stacks and to move during service due to thermal expansion and/or vibration for example. This further reduces the stress placed on the mating pipes 4, 6 compared to when a conventional slip joint is used. The dynamic angular or pivotable movement that is allowed with the slip joint apparatus of the present invention can absorb initial misalignment when the slip joint apparatus is first assembled but can also withstand dynamic angular movement during service or use of the apparatus.

The reduced contact area of base surface 104 with pipe 4 in the present invention compared to prior art arrangements is that it allows for increased contact pressure for any given applied load. In turn, this allows for a lower sealing force being provided by the sealing gasket 102 and means the joint apparatus can move more easily while maintain the seal.

Preferably the contact point of the gasket 102 ends at the radius transition 118 of the slip flare 8 between skirt 14 and the joining section 120 with skirt 12. Thus, the point at which side wall 106 of the sealing means is joined to the side wall 110 of the sealing means is provided at this radius transition 118 of the slip flare in one embodiment. This could, if required, be provided to allow sealing means of the present invention.

FIG. 2b shows the forces that are applied to the slip joint apparatus of the present invention in use. As the clamp 22 located around the sealing means is tightened in use, a radially inward force is applied by the clamp 22 onto the slip flare 8 and the flared end 7 of the pipe 6, as shown by arrows 122. This causes the slip flare 8 and the flared end 7 of pipe 6 to apply an inward force that is normal to their angular flank surfaces, caused by the well established welding principle that applies to clamps, and preferably V-clamps, as shown by arrows 124. Subsequent compression of the sealing gasket 102 causes the contact base surface 104 to form a seal with the outer surface of inlet pipe 4, as shown by arrows 126.

The side wall 110 of sealing gasket 102 (i.e. the wall opposite to the base surface) is shaped so as to conform or substantially conform to the shape of the inner surfaces of the slip flare 8 and the flared end 7 of the outlet pipe 6. This allows the gasket to be compressed with minimal spaces for the sealing gasket to compress other than towards the inlet pipe 4. In the illustrated example, the side wall 110 therefore conforms substantially to the inwardly facing V-shape of the clamp arrangement. The base surface 104 of the sealing gasket 102 is shaped so as to optimally transfer the forces of the clamp to the contact sealing surface it makes with the inlet pipe 4 at 104.

FIGS. 3a-3f illustrate a non-exhaustive set of examples of how the sealing gasket could be formed in order to still provide the advantages of the present invention. In FIG. 3a, the base surface 104 of the sealing gasket 102 is flat and the adjoining side walls 106, 108 are curved. In FIG. 3b, the entire base surface 104 of the sealing gasket 102 is curved or convexed and the adjoining side walls 106, 108 are provided to protrude upwardly and inwardly of the curved base surface. In FIG. 3c, the base surface 104 of the sealing gasket 102 and the side walls 106, 108 are curved such that the cross sectional shape of the gasket is circular or substantially circular. In FIG. 3d, the base surface 104 and the side walls 106, 108 of the sealing gasket are shaped so as to form a lozenge like shape, but it could also be oval, substantially oval, elliptical, substantially elliptical and/or the like. In FIG. 3e, the base surface 104 of the sealing gasket forms an apex or point. In FIG. 3f, the shape of the sealing gasket 102 is similar to that of the sealing gasket in FIGS. 2a-2c but the side walls 106, 108 adjoining base surface 104 are at a larger angle with respect to the base surface 104. It will be appreciated that other shapes and arrangements could be provided for the sealing gasket whilst still providing the advantages set out herein.

The invention claimed is:

1. A slip joint apparatus,
said slip joint apparatus including a first item having a first end; and
a second item having a second end;
the second end of the second item being arranged so that it can be moved into overlapping engagement with the first end of the first item in use;
clamping means movable between a clamped position, wherein a clamping force is applied to the first and second items being joined together in use; and
an unclamped position, wherein a clamping force is removed or reduced to allow separation of the items in use; and
sealing means comprising:
first surface facing away from the clamping means, the first surface comprising a maximum length of 3 mm+/−in an unclamped position and where the first surface is arranged to be located on an outer surface of the first item in use,
first and second side walls extending away from said first surface towards the clamping means with an interior angle between the first and second side walls is less than 140 degrees, said interior angle measured within the sealing means, and
a third side wall connecting the first and second side walls, the third side wall extending from the first and second side walls away from the first surface; and
wherein the first surface and the first and second side walls of the sealing means are arranged so as to allow a degree of pivotable and/or angular movement of at least the first surface of the sealing means with respect to the outer surface of the first item in both the clamped and unclamped positions in use.

2. A method of using a sealing means;
said method including the steps of moving a first surface of the sealing means into contact with a surface of an item-such that first and second side wall surfaces of the sealing means extend away from the first surface of the sealing means; and
shaping, designing and/or dimensioning the first surface of the sealing means so as to provide, in an unclamped position, a point or apex or have a maximum length of 3 mm+/−0.5 mm and providing the total angle between the first and second side wall surfaces adjoining the first surface of the sealing means of less than 140 degrees;
wherein the first surface of the sealing means allows for pivotal or angular movement in both clamped and unclamped positions due to the length of the first surface and the total angle between the first and second side wall surfaces extending from the first surface;
wherein the first surface is in contact with the surface of the item along a full, continuous length of the first surface.

* * * * *